UNITED STATES PATENT OFFICE

2,537,633
2,5-DISUBSTITUTED-TETRAHYDRO-1,2,5-THIADIAZINES AND METHODS OF PREPARING SAME

George E. P. Smith, Jr., Akron, Ohio, and James A. Shotton, Cedar Rapids, Iowa, assignors to The Firestone Tire & Rubber Company, Akron, Ohio, a corporation of Ohio No Drawing. Application March 30, 1949, Serial No. 84,492

8 Claims. (Cl. 260—243)

This invention relates to 2,5-disubstituted-tetrahydro-1,2,5-thiadiazine-6-thiones. These compounds are useful as curing agents in rubbery materials and may also be of value as insecticides, agricultural fungicides, etc.

The new compounds are obtained by oxidation of N'-hydrocarbon-substituted (beta-aminoethyl)-N-hydrocarbon-substituted dithiocarbamic acids, as indicated in the following equation:

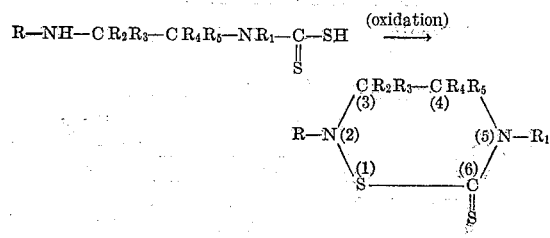

The R's stand for aliphatic groups of one to twenty carbon atoms, such as methyl, ethyl, propyl, octyl, dodecyl, octadecyl (straight chain and branched chain), etc. including unsaturated aliphatic groups such as allyl, methallyl, octadecenyl, etc., cyclo-substituted aliphatic groups, such as benzyl, furfuryl, tetrahydrofurfuryl, etc., and cycloaliphatic groups such as cyclopentyl, cyclohexyl, etc., and may also stand for terpenyl groups such as, for example, bornyl, isobornyl, etc. Generally the 3- and 4-positions are unsubstituted, i. e., $R_1$, $R_2$, $R_3$ and $R_4$ are hydrogen, but the reaction proceeds in the same manner when these positions are substituted. The R's may be the same throughout or may be different substituents.

Oxidation may be effected in any convenient manner. Ordinarily a halogen or other halogen oxidizing agent such as sodium hypochlorite, etc. will be employed. Hydrogen peroxide, ammonium persulfate, sodium perborate, etc. may be used.

The following example illustrates the method of preparing these compounds.

N,N'-diethylethylenediamine is obtainable by reacting an excess of two moles of ethylamine with one mole of ethylene dichloride in a bomb, alkalizing the product with aqueous NaOH to free the amine from its hydrochloride, separating from the NaOH, and distilling. N,N'-diethylethylenediamine boils at 65.5° C. at 35 mm.

N'-beta-ethylamino-ethyl-N-ethyl dithiocarbamic acid was obtained by adding dropwise to a solution of one mole of N,N'-diethylethylenediamine in acetone, a slight excess over one mole of carbon disulfide in acetone. The solution was cooled to prevent the temperature rising above 15° C. The acid precipitated, and was washed with acetone and ether.

Example

One hundred and ninety-two grams (1 mole) of N'-beta-ethylamino-ethyl-N-ethyl dithiocarbamic acid were dissolved in 500 cc. of water containing 50 grams of sodium hydroxide and then diluted to a liter. To this was added, through a dropping funnel, 254 grams of iodine (1 mole) and 275 grams of potassium iodide dissolved in 1 liter of water. The drops came just rapidly enough so that a continuous stream was broken. The alkaline solution was stirred vigorously with an electric stirrer as the iodine solution was added. The oxidized product was precipitated as it was formed. This was filtered off after reaction was completed. The precipitate was washed on the filter to remove any alkali and then dried. The dried precipitate was treated with ether to dissolve the product, namely, 2,5-diethyltetrahydro-1,2,5-thiadiazine-6-thione. The compound was recrystallized after evaporation of the ether. The properties of the compound are given in the following table.

The N-cyclohexyl-N'-beta-cyclohexylaminoethyl dithiocarbamic acid and N-isopropyl-N'-beta-isopropylaminoethyl dithiocarbamic acid were oxidized in the same manner using the same molar proportions of alkali and iodine. 2,5-dicyclohexyltetrahydro-1,2,5-thiadiazine-6-thione and 2,5-diisopropyltetrahydro-1,2,5-thiadiazine-6-thione were recovered and crystallized in the same manner.

The properties of the above three compounds are recorded in the following table in which the compounds are identified by reference to the 2,5-dialkyl substituent. The melting points are corrected. The molecular weights were determined by the cryoscopic method in benzene.

*Properties of 2,5-dialkyl tetrahydro-1,2,5-thiadiazine-6-thiones*

| Thione | Melting Point | Molecular Weight | | Analyses | | | |
|---|---|---|---|---|---|---|---|
| | | | | Calculated | | Found | |
| | | Calculated | Found | Per Cent N | Per Cent S | Per Cent N | Per Cent S |
| | °C. | | | | | | |
| diethyl | 62.0– 62.5 | 190.3 | 197 | 14.71 | 33.69 | 14.9 | 33.9 |
| diisopropyl | 104.8–105.0 | 218.4 | 214 | 12.82 | 29.32 | 13.2 | 29.6 |
| dicyclohexyl | 138.8–139.6 | 298.5 | 299 | 9.41 | 21.48 | 9.8 | 21.7 |

What we claim is:

1. Compound of the following formula

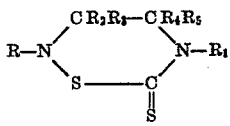

in which R and $R_1$ are from the class consisting of alkyl, cycloalkyl, and alkenyl and $R_2$, $R_3$, $R_4$, and $R_5$ are from the class consisting of hydrogen, alkyl, cycloalkyl, alkenyl, none of the foregoing substituents containing more than twenty carbon atoms.

2. 2,5 - dialkyltetrahydro-1,2,5-thiadiazine-6-thiones in which the alkyl groups contain one to eighteen carbon atoms.

3. 2,5 - diethyltetrahydro - 1,2,5-thiadiazine-6-thione.

4. 2,5 - dicyclohexyltetrahydro - 1,2,5-thiadiazine-6-thione.

5. 2,5-diisopropyltetrahydro-1,2,5-thiadiazine-6-thione.

6. The method of producing a 2,5-disubstituted-tetrahydro - 1,2,5 - thiadiazine-6-thione which comprises oxidizing by an oxidizing agent of the class consisting of halogen oxidizing agents, hydrogen peroxide, ammonium persulfate and sodium perborate, an alkali metal salt of an N'-substituted (beta-aminoethyl)-N-substituted dithiocarbamic acid of the class of such compounds (1) in which the 3- and 4-positions are unsubstituted and (2) in which the 3- and 4-positions are substituted by substituents of the class consisting of alkyl, cycloalkyl, and alkenyl and in which the N-substituents and N'-substituents are from the class consisting of alkyl, cycloalkyl, and alkenyl, none of the foregoing substituents containing more than twenty carbon atoms.

7. The method of producing a 2,5-dialkyltetrahydro - 1,2,5-thiadiazine-6-thione which comprises oxidizing by an oxidizing agent of the class consisting of halogen oxidizing agents, hydrogen peroxide, ammonium persulfate and sodium perborate, an alkali metal salt of an N'-alkyl (beta-aminoethyl)-N-alkyl dithiocarbamic acid in which the alkyl groups each contain one to eighteen carbon atoms and the 3- and 4-positions are unsubstituted.

8. The method of producing 2,5-dialkyltetrahydro - 1,2,5-thiadiazine-6-thione which comprises oxidizing with a halogen oxidizing agent an alkali metal salt of an N'-alkyl (beta-aminoethyl)-N-alkyl dithiocarbamic acid in which the alkyl groups each contain one to eighteen carbon atoms and the 3- and 4-positions are unsubstituted.

GEORGE E. P. SMITH, JR.
JAMES A. SHOTTON.

REFERENCES CITED

The following references are of record in the file of this patent:

UNITED STATES PATENTS

| Number | Name | Date |
|---|---|---|
| 1,588,384 | Herz | June 8, 1926 |
| 1,985,287 | Haddock | Dec. 25, 1934 |
| 2,364,594 | Thurston | Dec. 5, 1944 |
| 2,466,396 | Dickey | Apr. 5, 1949 |